United States Patent
Moulsley

(10) Patent No.: US 9,621,242 B2
(45) Date of Patent: *Apr. 11, 2017

(54) DOWNLINK CONTROL SIGNALLING FOR INDICATION OF INTERFERING LAYERS

(71) Applicant: FUJITSU LIMITED, Kawasaki-shi, Kanagawa (JP)

(72) Inventor: Timothy Moulsley, Caterham (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,052

(22) Filed: May 11, 2016

(65) Prior Publication Data
US 2016/0254849 A1 Sep. 1, 2016

Related U.S. Application Data

(63) Continuation of application No. 14/089,239, filed on Nov. 25, 2013, now Pat. No. 9,363,061, which is a (Continued)

(51) Int. Cl.
*H04L 5/00* (2006.01)
*H04B 7/0456* (2017.01)
(Continued)

(52) U.S. Cl.
CPC ......... *H04B 7/0456* (2013.01); *H04B 7/0639* (2013.01); *H04L 5/0023* (2013.01);
(Continued)

(58) Field of Classification Search
None
See application file for complete search history.

(56) References Cited

U.S. PATENT DOCUMENTS

2009/0195453 A1* 8/2009 Kim .................... H04B 7/0417
342/373
2010/0303034 A1* 12/2010 Chen .................... H04L 5/0023
370/329
(Continued)

FOREIGN PATENT DOCUMENTS

WO 2011/011566 1/2011

OTHER PUBLICATIONS

First Notification of Office Action issued for corresponding Chinese Patent Application No. 201180071964.X issued on Sep. 22, 2015 with an English translation.
(Continued)

*Primary Examiner* — Hassan Phillips
*Assistant Examiner* — Gautam Sharma
(74) *Attorney, Agent, or Firm* — Myers Wolin, LLC

(57) ABSTRACT

A method of communicating a plurality of transmission layers from at least one cell which is under the control of at least one base station to a user equipment. The plurality of transmission layers includes a data layer and an interference layer which are spatially multiplexed. The data layer includes user data for the user equipment and the interference layer interferes with the data layer. The method includes determining interference layer information relating to the interference layer, transmitting the data layer, the interference layer and a control channel message to user equipment. The control channel message includes a first information field and a second information field.

13 Claims, 13 Drawing Sheets

Figure 1A:
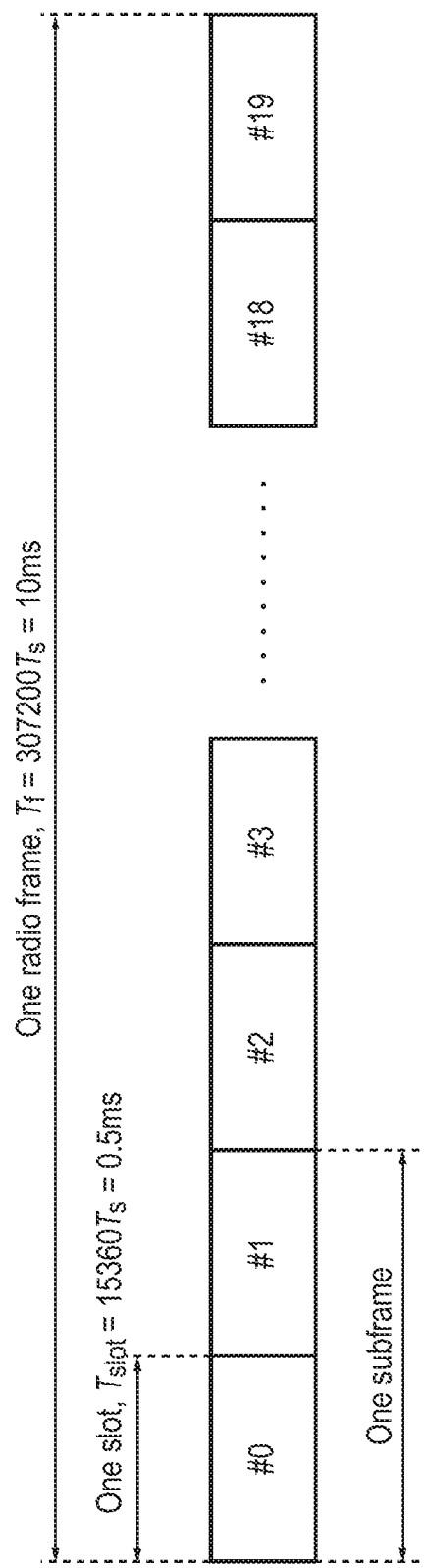

| One Codeword:<br>Codeword 0 enabled,<br>Codeword 1 disabled | | Two Codewords:<br>Codeword 0 enabled,<br>Codeword 1 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Related U.S. Application Data continuation of application No. PCT/EP2011/060899, filed on Jun. 29, 2011.

(51) Int. Cl.

| | | |
|---|---|---|
| *H04B 7/06* | (2006.01) | |
| *H04W 72/04* | (2009.01) | |
| *H04L 5/14* | (2006.01) | |
| *H04W 84/04* | (2009.01) | |

(52) U.S. Cl.
CPC .......... *H04L 5/0053* (2013.01); *H04L 5/0073* (2013.01); *H04L 5/0091* (2013.01); *H04W 72/042* (2013.01); *H04W 72/0413* (2013.01); *H04L 5/0007* (2013.01); *H04L 5/0035* (2013.01); *H04L 5/14* (2013.01); *H04W 84/042* (2013.01)

(56) References Cited

U.S. PATENT DOCUMENTS

| | | |
|---|---|---|
| 2010/0323709 A1 | 12/2010 | Nam et al. |
| 2011/0019776 A1 | 1/2011 | Zhang et al. |
| 2012/0201321 A1* | 8/2012 | Koivisto .............. H04B 7/0639 375/267 |

OTHER PUBLICATIONS

International search report issued for corresponding International Application No. PCT/EP2011/060899, mailed Mar. 23, 2012.

Panasonic; "DMRS port indicaiton with MU-MIMO considerations"; Agenda Item: 7.2.3.2 Use of DM RS ports / scrambling sequences for MU-MIMO; 3GPP TSG RAN WG1 Meeting #60; R1-101264; San Francisco, USA; Feb. 22-26, 2010.

Potevio; "Downlink signalling support for MU-MIMO in LTE-A"; Agenda Item: 6.3.3.2; 3GPP TSG RAN WG1 Meeting #61; R1-102988; Montreal, Canada; May 10-14, 2010.

InterDigital Communications, LLC; "Discussion on transparency of LTE-A MU-MIMO"; Agenda Item: 6.3.3.1; 3GPP TSG RAN WG1 #61; R1-103271; Montreal, Canada; May 10-14, 2010.

NTT DOCOMO, Panasonic; "Control Signaling to Support for Enhanced DL MIMO"; Agenda Item: 6.3.4; 3GPP TSG RAN WG1 Meeting #62; R1-104935; Madrid, Spain; Aug. 23-27, 2010.

* cited by examiner

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

FIG. 4

| Value | One Codeword: Codeword 0 enabled, Codeword 1 disabled NDI for TB2=0 No information indicated on interference | One Codeword: Codeword 0 enabled, Codeword 1 disabled NDI for TB2=1 Information indicated on interference | Two Codewords: Codeword 0 enabled, Codeword 1 enabled No information indicated on interference |
|---|---|---|---|
| | Message | Message | Message |
| 0 | 1 layer, port 7, $n_{SCID}=0$ | 1 layer, port 7, $n_{SCID}=0$ 1 layer interference, port 8 | 2 layers, ports 7-8, $n_{SCID}=0$ |
| 1 | 1 layer, port 7, $n_{SCID}=1$ | 1 layer, port 7, $n_{SCID}=1$ 1 layer interference, port 8 | 2 layers, ports 7-8, $n_{SCID}=1$ |
| 2 | 1 layer, port 8, $n_{SCID}=0$ | 1 layer, port 8, $n_{SCID}=0$ 1 layer interference, port 7 | 3 layers, ports 7-9 |
| 3 | 1 layer, port 8, $n_{SCID}=1$ | 1 layer, port 8, $n_{SCID}=1$ 1 layer interference, port 7 | 4 layers, ports 7-10 |
| 4 | 2 layers, ports 7-8 | 2 layers, ports 7-8 | 5 layers, ports 7-11 |
| 5 | 3 layers, ports 7-9 | 3 layers, ports 7-9 | 6 layers, ports 7-12 |
| 6 | 4 layers, ports 7-10 | 4 layers, ports 7-10 | 7 layers, ports 7-13 |
| 7 | Reserved | Reserved | 8 layers, ports 7-14 |

FIG. 5

| Value | One Codeword:<br>Codeword 0 enabled, Codeword 1 disabled<br>NDI for TB2=0<br>No information indicated on interference<br><br>Message | One Codeword:<br>Codeword 0 enabled,<br>Codeword 1 disabled<br>NDI for TB2=1<br>Information indicated on interference<br><br>Message | Two Codewords:<br>Codeword 0 enabled,<br>Codeword 1 enabled<br><br>No information indicated on interference<br><br>Message |
|---|---|---|---|
| 0 | 1 layer, port 7, $n_{SCID}=0$ | 1 layer, port 7, $n_{SCID}=0$<br>1 layer interference, port 8, $n_{SCID}=0$ | 2 layers, ports 7-8, $n_{SCID}=0$ |
| 1 | 1 layer, port 7, $n_{SCID}=1$ | 1 layer, port 7, $n_{SCID}=1$<br>1 layer interference, port 8, $n_{SCID}=1$ | 2 layers, ports 7-8, $n_{SCID}=1$ |
| 2 | 1 layer, port 8, $n_{SCID}=0$ | 1 layer, port 8, $n_{SCID}=0$<br>1 layer interference, port 7, $n_{SCID}=0$ | 3 layers, ports 7-9 |
| 3 | 1 layer, port 8, $n_{SCID}=1$ | 1 layer, port 8, $n_{SCID}=1$<br>1 layer interference, port 7, $n_{SCID}=1$ | 4 layers, ports 7-10 |
| 4 | 2 layers, ports 7-8 | 1 layer, port 7, $n_{SCID}=0$<br>1 layer interference, port 8, $n_{SCID}=1$ | 5 layers, ports 7-11 |
| 5 | 3 layers, ports 7-9 | 1 layer, port 7, $n_{SCID}=1$<br>1 layer interference, port 8, $n_{SCID}=0$ | 6 layers, ports 7-12 |
| 6 | 4 layers, ports 7-10 | 1 layer, port 8, $n_{SCID}=0$<br>1 layer interference, port 7, $n_{SCID}=1$ | 7 layers, ports 7-13 |
| 7 | Reserved | 1 layer, port 8, $n_{SCID}=1$<br>1 layer interference, port 7, $n_{SCID}=0$ | 8 layers, ports 7-14 |

FIG. 6

| Value | One Codeword: Codeword 0 enabled, Codeword 1 disabled NDI for TB2=0 No information indicated on interference | One Codeword: Codeword 0 enabled, Codeword 1 disabled NDI for TB2=1 Information indicated on interference | Two Codewords: Codeword 0 enabled, Codeword 1 enabled No information indicated on interference |
|---|---|---|---|
| | Message | Message | Message |
| 0 | 1 layer, port 7, $n_{SCID}=0$ | 1 layer, port 7, $n_{SCID}=0$ Interference configuration 1 | 2 layers, ports 7-8, $n_{SCID}=0$ |
| 1 | 1 layer, port 7, $n_{SCID}=1$ | 1 layer, port 7, $n_{SCID}=1$ Interference configuration 2 | 2 layers, ports 7-8, $n_{SCID}=1$ |
| 2 | 1 layer, port 8, $n_{SCID}=0$ | 1 layer, port 8, $n_{SCID}=0$ Interference configuration 3 | 3 layers, ports 7-9 |
| 3 | 1 layer, port 8, $n_{SCID}=1$ | 1 layer, port 8, $n_{SCID}=1$ Interference configuration 4 | 4 layers, ports 7-10 |
| 4 | 2 layers, ports 7-8 | 2 layers, ports 7-9 Interference configuration 5 | 5 layers, ports 7-11 |
| 5 | 3 layers, ports 7-9 | 3 layers, ports 7-9 Interference configuration 6 | 6 layers, ports 7-12 |
| 6 | 4 layers, ports 7-10 | 4 layers, ports 7-10 Interference configuration 7 | 7 layers, ports 7-13 |
| 7 | Reserved | Reserved | 8 layers, ports 7-14 |

FIG. 7

| Value | One Codeword: Codeword 0 enabled, Codeword 1 disabled NDI for TB2=0 No information indicated on interference | One Codeword: Codeword 0 enabled, Codeword 1 disabled NDI for TB2=1 No information indicated on interference | Two Codewords: Codeword 0 enabled, Codeword 1 enabled No information indicated on interference |
|---|---|---|---|
| | Message | Message | Message |
| 0 | 1 layer, port 7, $n_{SCID}=0$ | 1 layer, port 7, $n_{SCID}=0$<br>1 layer interference, port 8 | 2 layers, ports 7-8, $n_{SCID}=0$ |
| 1 | 1 layer, port 7, $n_{SCID}=1$ | 1 layer, port 7, $n_{SCID}=0$<br>3 layer interference, port 8-10 | 2 layers, ports 7-8, $n_{SCID}=1$ |
| 2 | 1 layer, port 8, $n_{SCID}=0$ | 1 layer, port 8, $n_{SCID}=0$<br>1 layer interference, port 7 | 3 layers, ports 7-9 |
| 3 | 1 layer, port 8, $n_{SCID}=1$ | 1 layer, port 8, $n_{SCID}=0$<br>3 layer interference, port 7, 9-10 | 4 layers, ports 7-10 |
| 4 | 2 layers, ports 7-8 | 1 layer, port 9, $n_{SCID}=0$<br>2 layer interference, ports 7-8 | 5 layers, ports 7-11 |
| 5 | 3 layers, ports 7-9 | 1 layer, port 9, $n_{SCID}=0$<br>3 layer interference, ports 7-8,10 | 6 layers, ports 7-12 |
| 6 | 4 layers, ports 7-10 | 1 layer, port 10, $n_{SCID}=0$<br>2 layer interference, port 7-8 | 7 layers, ports 7-13 |
| 7 | Reserved | 1 layer, port 10, $n_{SCID}=0$<br>3 layer interference, port 7-9 | 8 layers, ports 7-14 |

FIG. 8

DOWNLINK CONTROL SIGNALLING FOR INDICATION OF INTERFERING LAYERS

This application is a continuation of U.S. application Ser. No. 14/089,239, filed on Nov. 25, 2013, now pending, which is a continuation application of International Application No. PCT/EP2011/060899, filed on Jun. 29, 2011, the contents of each are herein wholly incorporated by reference.

The present invention relates to a method of communicating a plurality of transmission layers from at least one cell which is under the control of at least one base station to a user equipment, wherein the plurality of transmission layers includes a data layer and an interference layer which are spatially multiplexed, wherein the data layer comprises user data for the user equipment and the interference layer interferes with the data layer. The present invention further relates to a communication system, a computer program code, a control unit, to a base station and a user equipment for use in said method.

Particularly, but not exclusively, the present invention relates to communicating using spatial layers in accordance with the LTE (Long Term Evolution) and LTE-Advanced radio technology standards as, for example, described in the 36-series (in particular, specification documents 3GPP TS 36.xxx and documents related thereto), releases 9, 10 and subsequent of the 3GPP specification series. However, the present invention is also applicable to UMTS, WiMAX and other communication systems in which spatial layers may be communicated.

A radio communication network typically comprises several geographical areas which are called "cells". The term "cell" generally refers to a radio network object as a combination of downlink and optionally uplink resources. A cell can be uniquely identified by, for example a user equipment (UE), from a (cell) identification that is broadcasted over the geographical area from an Access Point or base station (BS). A cell may be in FDD (Frequency Division Duplex) or TDD (Time Division Duplex) mode, thus communicating with the user equipments assigned to the serving cell(s) using frequency or time as communication resources. Examples of radio communication networks are UMTS (Universal Mobile Telecommunications System), LTE, LTE-Advanced, WiMAX, also referred as "4G", and the like.

In a wireless communication system such as LTE and LTE-Advanced (referred to as "LTE-based systems" in the following, encompassing wireless communication systems with similar characteristics as those of LTE and/or LTE-Advanced), data for transmission on the downlink is organised in Orthogonal Frequency Division Multiplexing Access (OFDMA) frames each divided into a number of subframes. Various frame types are possible and differ between FDD and TDD for example.

Figure 1B:
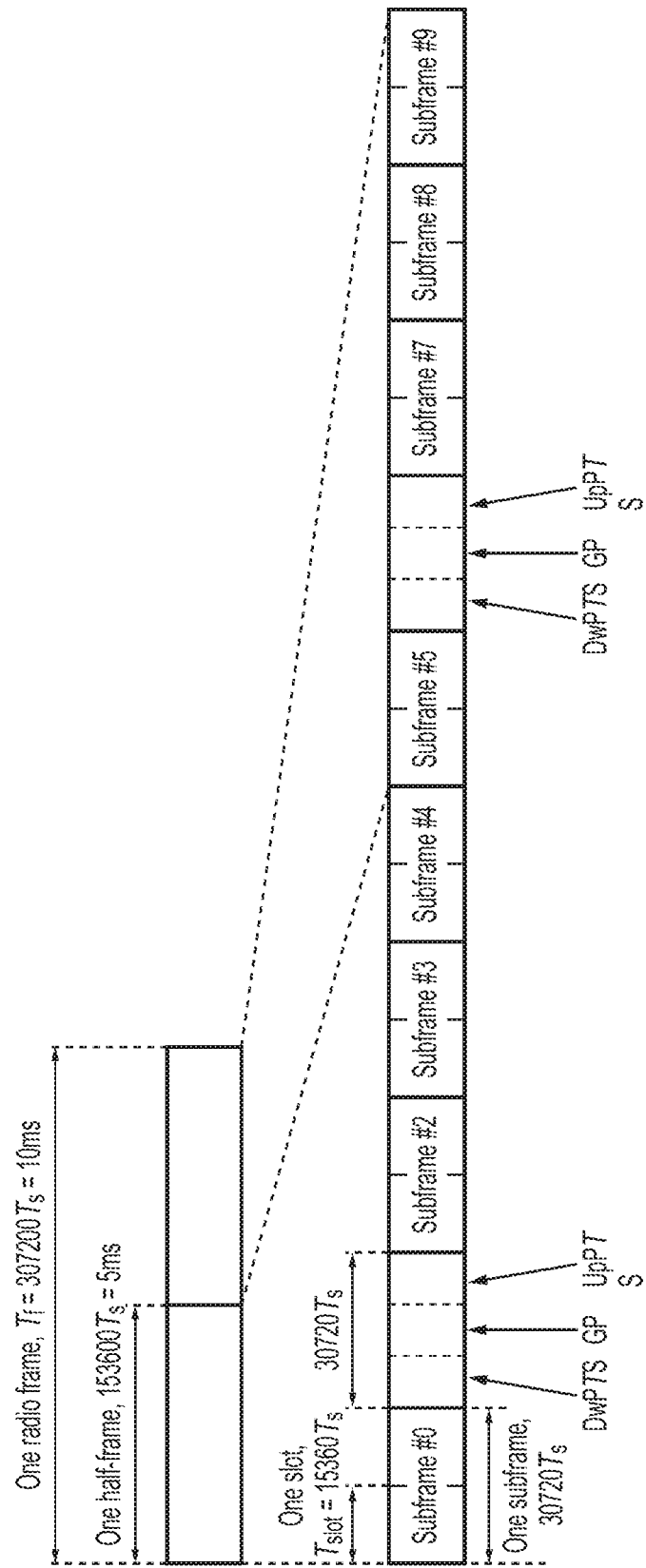

FIGS. 1a and 1b show frame structures for FDD (Type 1) and TDD (Type 2) for LTE-Advanced as described, for example, in 3GPP TS 36.211, section 4, which is hereby incorporated by reference. The size of various fields in the frames in the time domain is expressed as a number of time units $T_s=1/(15000\times 2048)$ seconds. Downlink and uplink transmissions are organized into radio frames with $T_f=307200\times T_s=10$ ms duration.

In FIG. 1a (FDD), each radio frame is $T_f=307200\cdot T_s=10$ ms long and consists of 20 slots of length $T_{slot}=15360\cdot T_s=0.5$ ms numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval. Uplink and downlink transmissions are separated in the frequency domain.

In FIG. 1b (TDD), each radio frame of length $T_f=307200\cdot T_s=10$ ms consists of two half-half-frames of length $153600\cdot T_s=5$ ms each. Each half-frame consists of five subframes of length $30720\cdot T_s=1$ ms. Each subframe i is defined as two slots, 2i and 2i+1 of length $T_{slot}=15360\cdot T_s=0.5$ ms in each subframe.

Figure 2:
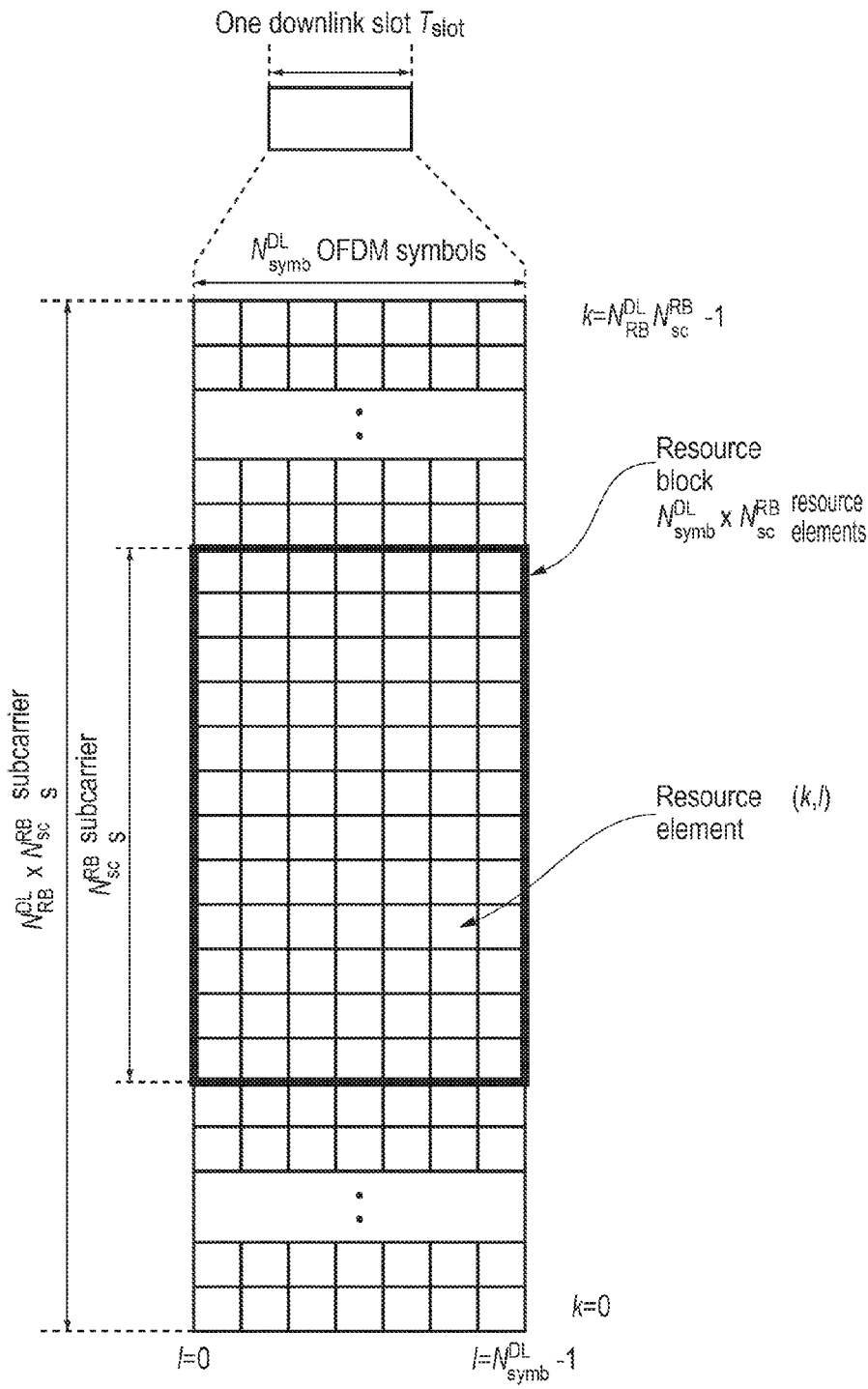

FIG. 2 illustrates a so-called downlink resource grid for the duration of one downlink slot for LTE-Advanced as described, for example, in 3GPP TS 36.211, section 6, which is hereby incorporated by reference. Each element in the resource grid is called a resource element and each resource element corresponds to one symbol. The transmitted signal in each slot is described by one or several resource grids of $N_{RB}^{DL}N_{sc}^{RB}$ subcarriers and $N_{symb}^{DL}$ Orthogonal frequency-division multiplexing (OFDM) symbols. The quantity $N_{RB}^{DL}$ depends on the downlink transmission bandwidth configured in the cell.

An antenna port is defined such that the channel over which a symbol on the antenna port is conveyed can be inferred from the channel over which another symbol (e.g. provided by a reference signal) on the same antenna port is conveyed. There is one resource grid per antenna port. The set of antenna ports supported may depend on a reference signal configuration in the cell.

In OFDMA, UEs of LTE and LTE-Advanced are allocated a specific number of subcarriers for a predetermined amount of time. These are referred to as resource blocks (RBs). RBs thus have both a time and frequency dimension. Allocation of RBs is handled by a scheduling function at the base station (an eNodeB in an LTE-based system). Several resource blocks may be allocated to the same UE, and these resource blocks do not have to be adjacent to each other.

Figure 3:
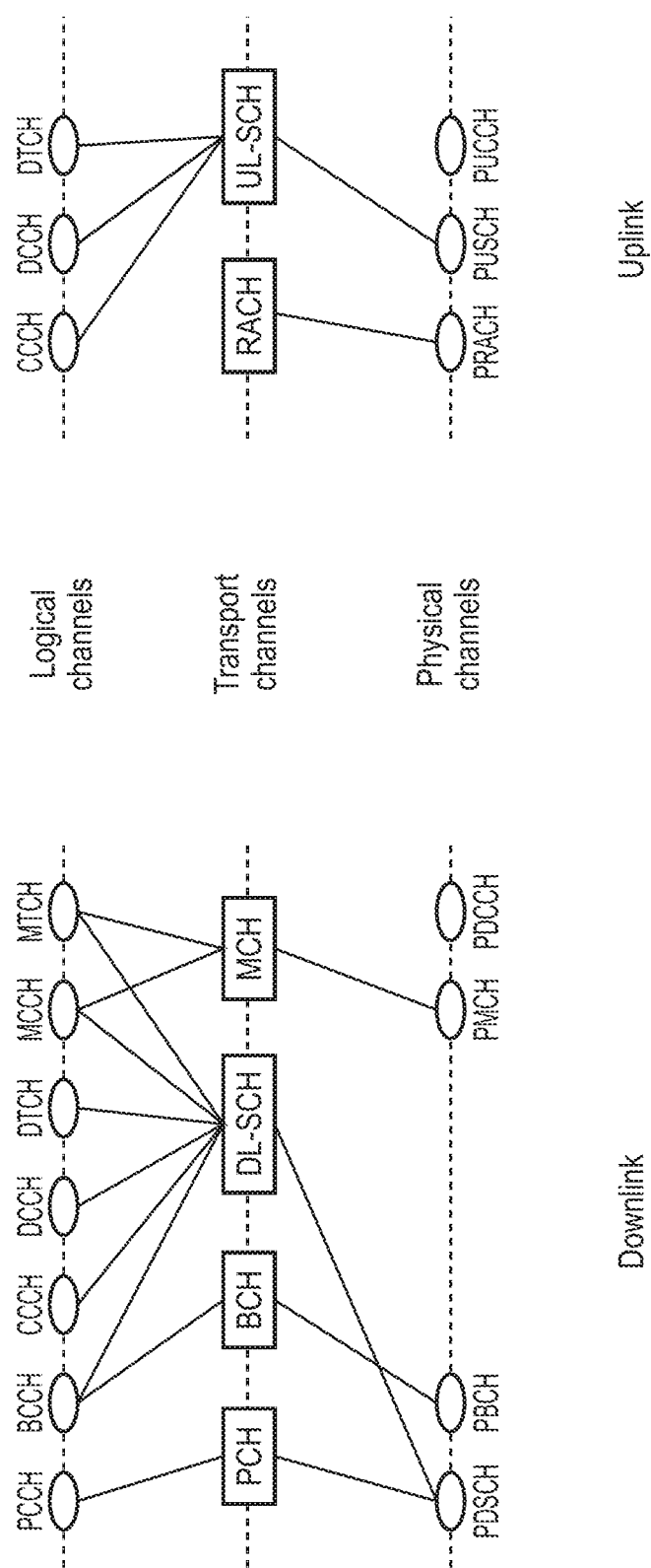

The data channels are shared channels in LTE-based systems, i.e. for each transmission time interval of 1 ms, a new scheduling decision is taken regarding which UEs are assigned to which time/frequency resources during this transmission time interval. Several "channels" for data and signalling are defined at various levels of abstraction within the network. FIG. 3 shows some of the channels defined in LTE-based systems at each of a logical level, transport layer level and physical layer level, and the mappings between them. For present purposes, the downlink channels are of particular interest.

On the downlink, the user data is carried on the Physical Downlink Shared Channel (PDSCH). Downlink control signaling on the Physical Downlink Control Channel (PDCCH) is used to convey the scheduling decisions to individual UEs. The PDCCH is usually located in the first OFDM symbols of a slot. A similar mechanism is used to transmit data between eNodeB and a relay node, where the scheduling information is carried by Relay-PDCCH (R-PDCCH), as described in TS 36.216, which is hereby incorporated by reference.

In LTE-based systems, the PDCCH carries downlink control information (DCI). Depending on the purpose of the control message, different formats of DCI are defined. The DCI provides information to the UE for enabling it to identify the resources where to receive the PDSCH in the subframe and how to decode it. Typically, a UE, upon detection of a PDCCH of a serving cell with a DCI format intended for the UE in a subframe, decodes the corresponding PDSCH in the same subframe with the restriction of the number of transport blocks defined in the higher layers. Further details of the physical downlink shared channel related procedures are described, for example, in 3GPP TS 36.213, section 7, which is hereby incorporated by reference.

The general structure for downlink physical channels is described, for example, in 3GPP TS 36.211, section 6.3, which is hereby incorporated by reference. A baseband signal representing a downlink physical channel is defined in terms of the following steps:

scrambling of coded bits in each of the codewords to be transmitted at least in part on (a) physical channel(s),
modulation of scrambled bits to generate complex-valued modulation symbols,
mapping of the complex-valued modulation symbols onto one or several transmission layers,
precoding of the complex-valued modulation symbols on each layer for transmission on the antenna ports,
mapping of complex-valued modulation symbols for each antenna port to resource elements,
generation of complex-valued time-domain OFDM signal for each antenna port.

A downlink physical channel corresponds to a set of resource elements carrying information originating from higher layers. On the other hand, a downlink physical signal corresponds to a set of resource elements used by the physical layer but does not carry information originating from higher layers. An example of a downlink physical signal is a reference signal. There are several types of reference signals (RSs), such as cell-specific reference signals (CRS), Multimedia Broadcast multicast service Single Frequency Network (MBSFN) reference signals, UE-specific reference signals (DM-RS), positioning reference signals (PRS), CSI reference signals (CSI-RS). For example, a UE-specific reference signal is received by a specific UE or a specific UE group within a cell and may be used by a specific UE or a specific UE group for the purpose of data demodulation. There is one reference signal transmitted per downlink antenna port. Reference signals are described, for example, in 3GPP TS 36.211, section 6.10, which is hereby incorporated by reference.

Data and control streams from/to the Medium Access Control (MAC) layer are encoded/decoded to offer transport and control services over the radio transmission link. Channel coding scheme is a combination of error detection, error correcting, rate matching, interleaving and transport channel or control information mapping onto/splitting from physical channels. 3GPP TS 36.212 describes the multiplexing and channel coding in more detail and is hereby incorporated by reference.

3GPP TS 36.213 describes the characteristics of the physicals layer procedures in the FDD and TDD modes in more detail and is hereby incorporated by reference.

A technique called multiple-input and multiple-output (MIMO) has been adopted in LTE-based systems due to its spectral efficiency gain, spatial diversity gain and antenna gain. This type of scheme employs multiple antennas at the transmitter and/or at the receiver (often at both) to enhance the data capacity achievable between the transmitter and the receiver. Typically, this is used to achieve an enhanced data capacity between one or more BSs and the UEs served by the BSs.

The term "channel" is used to describe the frequency (or equivalently time delay) response of the radio link between a transmitter and a receiver. The so-called MIMO channel contains all the subcarriers, and covers the whole bandwidth of transmission, or potential transmission. A MIMO channel contains many individual radio links (also called SISO channels for single-input single-output). In operation of MIMO to support spatial multiplexing in LTE, up two codewords may be simultaneously transmitted to (or from) a UE. A codeword may be mapped to one or more spatial layers, each spatial layer corresponding to a different antenna port.

There are different types of MIMO, such as multi-user MIMO (MU-MIMO) and single-user MIMO (SU-MIMO). In a MU-MIMO system, a base station communicates with multiple UEs each having at least one antenna. A SU-MIMO system exploits the fact that an UE has multiple antennas to improve capacity, reliability, and resistance to interference. While SU-MIMO increases the data rate of one user, MU-MIMO allows to increase the overall capacity.

Coordinated multi-cell MIMO transmission/reception (also called MIMO "coordinated multi-point transmission/reception" or CoMP) may be used to improve the coverage of high data rates, cell-edge throughput and/or to increase system throughput. The downlink schemes generally used in CoMP include "Coordinated Scheduling and/or Coordinated Beamforming (CS/CB)" and "Joint Processing/Joint Transmission (JP/JT)". Further details of CoMP as applicable to LTE-based systems can be found in the document 3GPP TR 36.814, also incorporated by reference.

In the operation of CoMP, UEs feed back channel state information. The channel state information is often detailed, and often includes measurements of one or more of channel state/statistical information, narrow band Signal to Interference plus Noise Ratio (SINR), etc. The channel state information may also include measurements relating to channel spatial structure and other channel-related parameters including the UE's preferred transmission rank and precoding matrix.

In multi-cellular networks, the spectral efficiency of downlink transmission is typically limited by inter-cell interference arising from transmissions to UEs served by other cells. In addition, performance in MU-MIMO mode may be limited by interference between transmissions intended for different UEs in the same cell.

It is desirable to improve a signal to interference ratio for a user equipment especially in the inter-cell area.

According to an aspect of the invention, a method of communicating a plurality of transmission layers from at least one cell which is under the control of at least one base station to a user equipment is provided, wherein the plurality of transmission layers includes a data layer and an interference layer which are spatially multiplexed, wherein the data layer comprises user data for the user equipment and the interference layer interferes with the data layer, wherein the method comprises:

determining interference layer information relating to the interference layer,
transmitting the data layer, the interference layer and a control channel message to the user equipment, wherein the control channel message comprises a first information field including data layer information relating to the data layer and a second information field including the interference layer information relating to the interference layer, and
processing the data layer in accordance with the data layer information and processing the interference layer in accordance with the interference layer information for obtaining the user data at the user equipment,
wherein the first information field comprises a first codeword field relating to a first codeword transmitted at least in part on the data layer, and
wherein the second information field comprises a second codeword field including the interference layer information in a first mode and relating to a second codeword transmitted at least in part on a further data layer of the plurality of transmission layers in a second mode.

The invention achieves providing information on the interference layer spatially multiplexed with the data layer containing the user data to the user equipment, with the additional benefit of not increasing the size of the associated control channel message, thus allowing an improvement in the signal to interference ratio for a user equipment especially in the inter-cell area.

Wanted and unwanted signals at a user equipment (also referred to as "mobile station") can be considered as different spatial layers in a MIMO communication system. The term "spatial layer" refers to different streams generated by spatial multiplexing. A transmission spatial layer (also referred to as "transmission layer") thus can be described as a mapping of symbols onto the transmit antenna ports. Spatial multiplexing thus allows transmitting different streams of encoded data signals simultaneously on the same resource block(s) by exploiting the spatial dimension of the radio channel. The plurality of transmission layers may comprises one or more data layers and one or more interference layers. These data streams can be intended for one single user equipment (single user MIMO/SU-MIMO equipment) or to different user equipments (multi user MIMO/MU-MIMO equipments).

A UE with multiple receive antennas can choose antenna weights to receive a wanted layer while rejecting a spatially separate interfering layer (also referred to as "interference layer"). In order to choose suitable weights, an receiver of the UE identifies preferably the spatial signatures of the wanted and unwanted signals. A receiver based on MMSE (Minimum Mean Square Error) processes the channel matrix for the wanted signal and the covariance matrix of the interference for this purpose.

$$W^H = H^H(HH^H + N)^{-1}$$

where:
W is the matrix of receiver weights
H is the channel matrix for the wanted signal(s)
N is the covariance matrix of the noise plus interference In a LTE-based system, the channel matrix of the wanted signal may be obtained using DM-RS corresponding to the wanted layer(s). The UE is thus aware of the time/frequency location of these DM-RS and also the reference signal modulation sequence.

The inventor found that interference layer information relating to the interference layer, such as, for example, covariance matrix information of the interference or reference information such as DM-RS corresponding to the unwanted interference layer(s), may be signalled to the UE within an second information field format of a control channel message. This allows more effective interference rejection by the UE, and improved downlink transmission performance.

Thus, information about transmission(s) from one or more interfering layers of one or more interfering cells is provided to a mobile terminal (UE), preferably in an LTE-Advanced system. The invention is based on the recognition that in order to benefit from multiple receive antennas for the rejection of spatially separate interference sources, the UE requires reference signals corresponding to both wanted and unwanted signals. An unwanted signal can be considered as a different spatial layer and could be from the same cell serving the UE (i.e. MU-MIMO) or from a different cell. Under the assumption of low SIR conditions corresponding to low transmission rank, with one wanted layer and one codeword (referred to as the "first codeword"), control channel signaling bits for a second codeword are not required and may therefore be available to indicate the information about the interfering layer(s). Thus, the second codeword field of the second information field may be used for the interference layer information in a first mode (in which only one codeword is employed) and may be used for a second codeword in a second mode.

It may also be preferred that the second information field comprises an (additional) interference layer field including the interference layer information in the first as well as in the second mode.

Where the interference arises from a different cell, co-operation/information exchange between cells may be applied (i.e. CoMP operation). In a preferred embodiment relating to LTE-Advanced, the New Data Indicator (NDI) bit for the unused second codeword may be used to indicate information about one or more interfering layers which may be present. The same mechanism may be used for both MU-MIMO and CoMP.

In the first mode, the wanted signal comprises one (i.e. the first) codeword and the control channel message format comprises a first codeword field relating to the first codeword and is used to indicate the presence of and/or further information about the interference layer. However, in the second mode, the control channel message format may be used to indicate information relating to two codewords, i.e. the first and the second codeword. This means that, in the first mode, signalling bits for the second codeword are not used and can therefore be used to indicate that an interfering signal is present. This situation may correspond to one spatial layer (rank 1 transmission) for the wanted signal and one spatial layer for the interfering signal. However, more than one layer for the wanted data signal and/or the unwanted interfering signal may also be accommodated.

In a preferred embodiment, the second codeword field has the same number of bits in the first mode and the second mode. Preferably, the second codeword field has the same size in the first mode and in the second mode. Thus, the interference layer information may be indicated to the user equipment without modifying the format of an existing second codeword field.

In LTE-Advanced, release 10, a control channel message format (DCI format 2C) is pne of the formats defined for scheduling downlink transmissions to the UE. This supports transmission of up to two codewords using up to 8 antenna ports. In a preferred embodiment, the DCI format 2C is used to indicate the interference layer information about potential interferer(s) to the UE. However, in other preferred embodiments, other control channel message formats of LTE-based systems or other wireless communication networks may be used for indicating interference layer information about potential interferer(s) to an user, user equipment, mobile terminal or the like.

In a preferred embodiment, the second codeword field comprises a new data indicator field. Preferably, the new data indicator (NDI) is one bit which indicates whether the packet is a new transmission or a retransmission. Preferably, the NDI bit for the (unused) second codeword may be used for indicating the presence of, or other information relating to, an interference layer(s). However, also other bits of the second information field may indicate the presence of an interference layer(s).

In a preferred embodiment, the interference layer information indicates at least one of the following:
a spatial signature of the interference layer,
an antenna port of the interference layer, the presence of the interference layer,
a presence of at least one further interference layer of the plurality of transmission layers,
a number of at least one further interference layer of the plurality of transmission layers,
a location of a reference signal relating to the interference layer,
locations of reference signals relating to at least one further interference layer of the plurality of transmission layers,
a modulation sequence of a reference signal relating to the interference layer, and
modulation sequences of reference signals relating to at least one further interference layer of the plurality of transmission layers.

The UE is preferably informed of the antenna port(s) of the interference layer(s) for identifying a potential interference source which means that the interference layer information relating to the relevant reference symbols is provided to the UE. This preferably allows the UE to estimate the spatial covariance matrix of the interference source using measurements on the reference symbols.

Preferably, the interference layer information indicates the presence of one or more interferers (wherein "interferer" refers to interference layer(s) associated with interference source(s)), the number of interferer(s), location in the time/frequency domain of reference signals relating to interferer(s), and/or modulation sequence of reference signal relating to interferer(s).

In a preferred embodiment, the method further comprises:
determining a spatial covariance matrix of an interference source associated with the interference layer,
transmitting spatial covariance matrix information representing the spatial covariance matrix in the control channel message to the user equipment, and
wherein the step of processing the interference layer in accordance with the interference layer information at the user equipment includes:
processing the interference layer in accordance with the spatial covariance matrix information.

In another preferred embodiment, the step of processing the interference layer in accordance with the interference layer information at the user equipment includes:
determining a spatial covariance matrix of an interference source associated with the interference layer on the basis of the interference layer information.

Preferably, the UE estimates the covariance matrix based on, for example, the DM-RS corresponding to the unwanted interfering layers. In this case, basic information such as the location of the DM-RS and any applied spreading code may be used by the UE for estimating the covariance matrix. The estimation may be made on a symbol by symbol basis, so it may not be necessary for the UE to know the reference signal modulation sequence for the interfering source associated with the interference layer.

In a preferred embodiment, the step of processing the interference layer in accordance with the interference layer information at the user equipment includes:
rejecting the interfering layer.

The step of processing the interference layer in accordance with the interference layer information at the user equipment provides the user equipment with information which antenna ports to allow to receive transmission layers. That is, the step of processing the interference layer allows the step of processing the data layer to be carried out properly to obtain the user data at the user equipment. Preferably, a step of receiving the transmission layers, preferably the data layer, at the user equipment depends on the step of processing the interference layer in accordance with the interference layer information.

In a preferred embodiment, the step of processing the data layer in accordance with the data layer information includes:
weighting the data layer with a first weighting factor in accordance with the data layer information, and
wherein the step of processing the interference layer in accordance with the interference layer information includes:
weighting the interference layer with a second weighting factor in accordance with the interference layer information, and
wherein the first weighting factor is higher than the second weighting factor.

Preferably, the user equipment chooses first and second weighting factor as antenna weights for enabling the processing of the data layer(s) and for rejecting the one or more interference layers. The first and second antenna weights are determined in accordance with the data layer information and the interference layer information and, preferably, on the basis of the spatial signatures of the wanted and unwanted signals, i.e. the data layer(s) and the interference layer(s).

In a preferred embodiment, the method further comprises:
preparing feedback information indicating feedback based on the step of processing the interference layer, and
transmitting the feedback information from the user equipment to the at least one base station.

Preferably, the UE provides feedback on a transmission channel state to the base station. Thus, the base station is enabled to schedule efficient transmissions to the UE with appropriate transmission parameters and resources. Preferably, the feedback indicates whether the user equipment requests further information about the interference layer(s), i.e. particular properties, if the user equipment currently only receives information about the presence of the interference layer(s).

In another aspect, the present invention relates to a control unit for controlling a communication of a plurality of transmission layers from at least one cell which is under the control of at least one base station to a user equipment, wherein the plurality of transmission layers includes a data layer and an interference layer which are spatially multiplexed, wherein the data layer comprises user data for the user equipment and the interference layer interferes with the data layer, wherein the control unit comprises:
an interference layer information determining unit for determining interference layer information relating to the interference layer, and
a transmission control unit for causing transmitting the data layer, the interference layer and a control channel message to the user equipment, wherein the control channel message comprises a first information field including data layer information relating to the data layer and a second information field including the interference layer information relating to the interference layer,
wherein the first information field comprises a first codeword field relating to a first codeword transmitted at least in part on the data layer, and
wherein the second information field comprises a second codeword field including the interference layer information in a first mode and relating to a second codeword transmitted at least in part on a further data layer of the plurality of transmission layers in a second mode.

In another aspect, the present invention relates to a user equipment for receiving a plurality of transmission layers from at least one cell which is under the control of at least one base station, wherein the plurality of transmission layers includes a data layer and an interference layer which are spatially multiplexed, wherein the data layer comprises user data for the user equipment and the interference layer interferes with the data layer, wherein the user equipment comprises:
- a receiving unit for receiving the data layer, the interference layer and a control channel message, wherein the control channel message comprises a first information field including data layer information relating to the data layer and a second information field including interference layer information relating to the interference layer, and
- a processing unit for processing the data layer in accordance with the data layer information and for processing the interference layer in accordance with the interference layer information for obtaining the user data at the user equipment,
- wherein the first information field comprises a first codeword field relating to a first codeword received on the data layer, and
- wherein the second information field comprises a second codeword field including the interference layer information in a first mode and relating to a second codeword received on a further data layer of the plurality of transmission layers in a second mode.

In another aspect, the present invention relates to a base station for communicating a plurality of transmission layers from at least one cell which is under the control of the base station to a user equipment, wherein the plurality of transmission layers includes a data layer and an interference layer which are spatially multiplexed, wherein the data layer comprises user data for the user equipment and the interference layer interferes with the data layer, wherein the base station comprises the control unit as disclosed in the present application.

In another aspect, the present invention relates to a communication system for communicating a plurality of transmission layers from at least one cell which is under the control of at least one base station to a user equipment, wherein the plurality of transmission layers includes a data layer and an interference layer which are spatially multiplexed, wherein the data layer comprises user data for the user equipment and the interference layer interferes with the data layer, wherein the communication system comprises:
- an interference layer information determining unit for determining interference layer information relating to the interference layer,
- a transmission control unit for causing transmitting the data layer, the interference layer and a control channel message to the user equipment, wherein the control channel message comprises a first information field including data layer information relating to the data layer and a second information field including the interference layer information relating to the interference layer, and
- a processing unit for processing the data layer in accordance with the data layer information and for processing the interference layer in accordance with the interference layer information for obtaining the user data at the user equipment,
- wherein the first information field comprises a first codeword field relating to a first codeword transmitted at least in part on the data layer, and
- wherein the second information field comprises a second codeword field including the interference layer information in a first mode and relating to a second codeword transmitted at least in part on a further data layer of the plurality of transmission layers in a second mode.

Preferably, the communication system comprises a user equipment and a control unit as disclosed in the present application.

In another aspect, the present invention relates to a computer program code for, when executed, causing a computer to perform any of the methods as disclosed in the present application. In another aspect, the present invention relates to a computer readable medium storing program code for, when executed, causing a computer to perform any of the methods as disclosed in the present application. In still another aspect, the invention relates to a computer-implemented method for, when executed, causing a computer to perform any of the methods as disclosed in the present application. Preferably, the method steps as disclosed in the present application may be carried out by software and/or hardware. Also, it is preferred that the control unit, the units of the user equipment, of the base station and/or of the communication system may be implemented in software and/or hardware.

Figure 9:
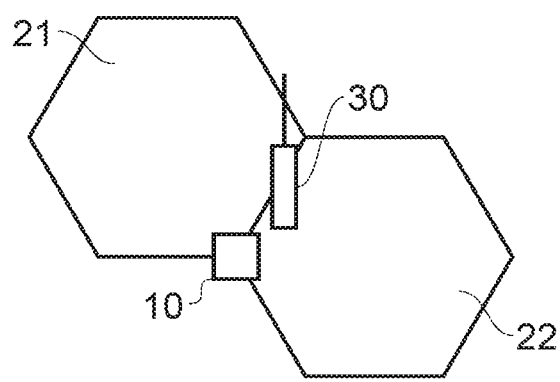
Figure 10:
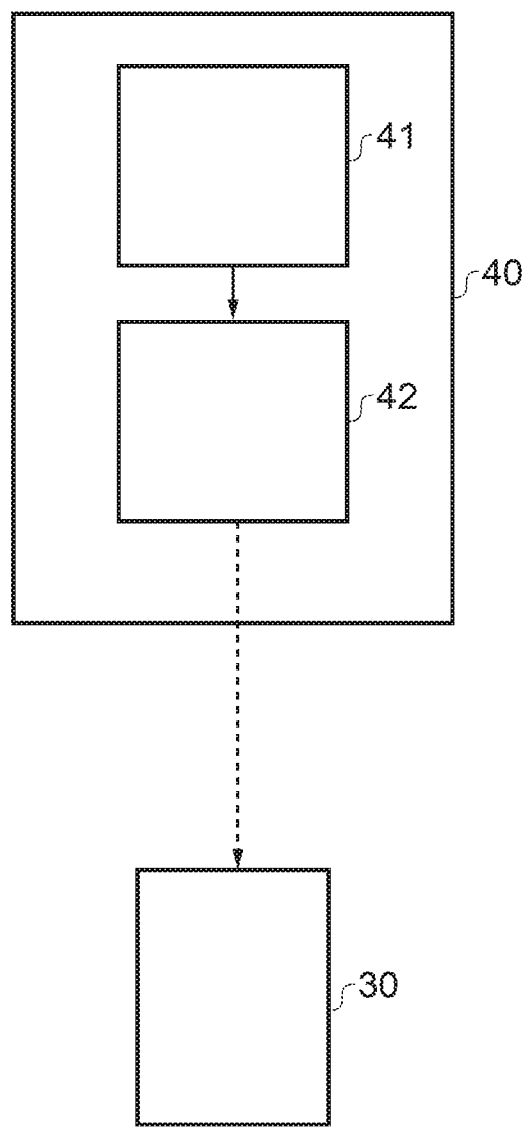
Figure 11:
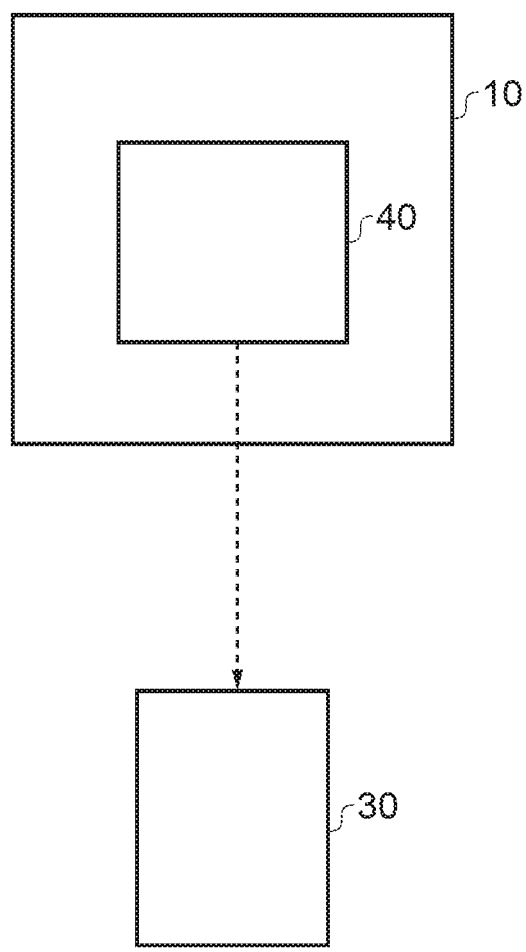
Figure 12:
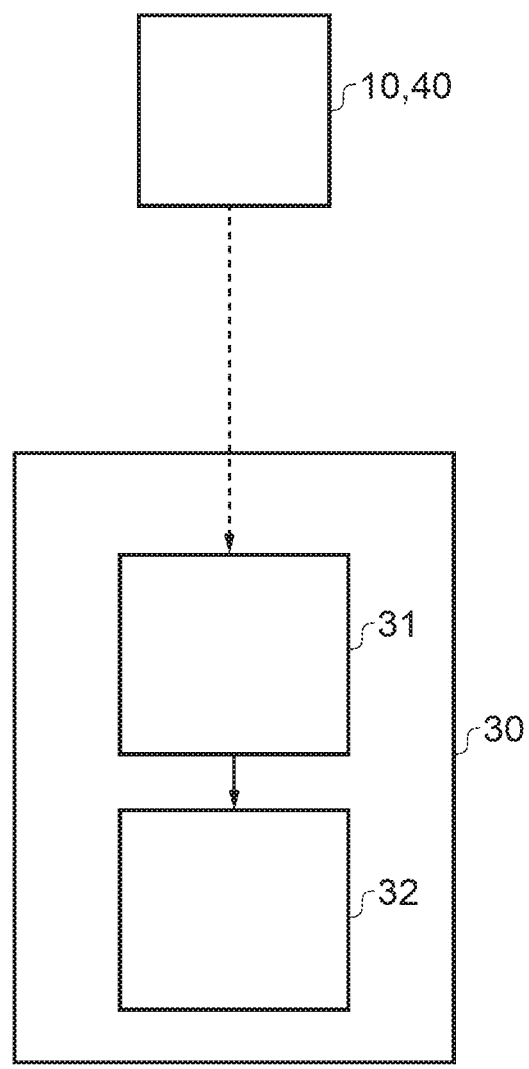

Preferred embodiments of the present application will now be described, by way of example, with reference to the accompanying drawings in which, FIG. 1A illustrates frame structure for FDD;
FIG. 1B illustrates frame structure for TDD;
FIG. 2 illustrates a downlink resource grid;
FIG. 3 illustrates logic, transport and physical channels and the corresponding mapping thereof;
FIG. 4 illustrates a data layer information table;
FIG. 5 illustrates a second embodiment of a transmission layer information table in accordance with the present invention;
FIG. 6 illustrates a third embodiment of a transmission layer information table in accordance with the present invention;
FIG. 7 illustrates a fourth embodiment of a transmission layer information table in accordance with the present invention;
FIG. 8 illustrates a fifth embodiment of a transmission layer information table in accordance with the present invention;
FIG. 9 schematically illustrates an embodiment of a communication system in accordance with the present invention;
FIG. 10 schematically illustrates an embodiment of a control unit in accordance with the present invention;
FIG. 11 schematically illustrates an embodiment of a base station in accordance with the present invention; and
FIG. 12 schematically illustrates an embodiment of a user equipment in accordance with the present invention.

DETAILED DESCRIPTION OF THE INVENTION

Unless otherwise indicated, the embodiments described below are based on LTE-based systems, where the network operates using FDD and comprises one or more eNodeBs (base stations), each controlling one or more downlink cells, each downlink cell having a corresponding uplink cell. However, it is noted that the present invention is not limited to these constraints and the described embodiments only are examples of the invention's implementation.

As schematically illustrated in FIG. 9, a downlink cell(s) 21, 22 may serve one or more terminals (UEs) 30 which may receive and decode signals transmitted in that serving cell 21, 22. In order to control the use of transmission resources in time, frequency and spatial domains for transmission to and from the UEs 30, the eNodeB 10 comprising control unit 40 (not shown in FIG. 9) sends control channel messages (PDCCH) to the UEs 30. A PDCCH message typically indicates whether the data transmission will be in the uplink (using PUSCH) or downlink (using PDSCH). The PDCCH message also indicates the transmission resources, and other information such as transmission mode, number of antenna ports, data rate, number of codewords enabled. In addition, PDCCH may indicate which reference signals may be used to derive phase reference(s) for demodulation of a downlink transmission. The use of DCI format 2C (or a modified version of DCI format 2C) is assumed in the following, but the invention may be implemented in other DCI formats and other control channel messages as well. Reference signals for different antenna ports, but occupying the same locations, are distinguished by different spreading codes.

In order for the eNodeB 10 to schedule efficient transmissions to UEs 30 with appropriate transmission parameters and resources, the UE 30 provides feedback on the downlink channel state for one, two or more serving cells 21, 22 to the eNodeB 10 controlling the serving cell(s) 21, 22 for that UE 30. Specification or configuration of assumptions for computing such feedback preferably includes an indication of whether the UE 30 should assume the presence of interference with any particular properties.

As shown in FIG. 9, the UE 30 is configured to have two or more serving cells at the same carrier frequency, but the invention is not limited to this scenario. Thus, the UE 30 may also be configured to have only one serving cell at the carrier frequency.

In a first embodiment, a general indication of interference presence of one or more interfering layers in the downlink is provided to the UE. In a preferred embodiment, the indication is signalled using the NDI bit for a disabled codeword. In case of the DCI format 2C, the second codeword may be unused and hence the second codeword field's NDI may be used to carry the interference layer information (first mode) for indicating that interference is present, i.e. to indicate that there is an interference layer, with "NDI=1, and for indicating that no interference information is provided with "NDI=0". Thus, according to the first embodiment, the UE is informed about presence of interference, but not provided with any specific information the nature of the interference.

The second embodiment, which is explained with reference to FIG. 5, is similar to the first embodiment except that the indicated interference is associated with one or more specific antenna ports and corresponding reference signals. The UE deduces the antenna ports carrying the interference, and the corresponding reference signals, from the antenna ports configured for the wanted PDSCH transmission, and the configured set of reference signals. For example, if the reference signal locations can support a given set of antenna ports (e.g. antenna port 7 and antenna port 8), then when the presence of interference is indicated, the UE assumes that any antenna port(s) not used for PDSCH will carry interference. So if antenna port 7 is indicated as carrying the PDSCH, then antenna port 8 is assumed to represent interference. In this embodiment, the reference signals for ports 7 and 8 are distinguished by different spreading sequences. Further, the UE may assume that interference can only conform to valid transmission options.

An exemplary transmission layer information table of this embodiment is illustrated in FIG. 5. For the purposes of comparison, FIG. 4 illustrates data layer information table 5.3.3.1.5C-1 of 3GPP TS 36.212.

As can be seen from FIG. 4, in the left-hand column, only one codeword is enabled, whereas in the right-hand column, both codewords are enabled. In the following, case with one enabled codeword is discussed in further detail.

As described in 3GPP TS 36.212, section 5.3.3, which is hereby incorporated by reference, the DCI transports downlink or uplink scheduling information, requests for aperiodic Channel Quality Indicator (CQI) reports, notifications of Multicast Control Channel (MCCH) change or uplink power control commands for one cell and one Radio Network Temporary Identity (RNTI).

The DCI format 2C is described in 3GPP TS 36.212, section 5.3.3.1.5C, which is hereby incorporated by reference. The following information is transmitted by means of the DCI format 2C: carrier indicator, resource allocation header, resource block assignment, TPC (transmit power control) command for PUCCH, Downlink Assignment Index, HARQ (Hybrid Automatic Repeat Request) process number, antenna port(s), scrambling identity and number of layers, and SRS (Sounding Reference Signal) request.

In addition, the DCI format 2C comprises a first information field for transport block 1 comprising information of the modulation and coding scheme, the new data indicator (NDI) and the redundancy version. Similarly, the DCI format 2C comprises a second information field for transport block 2 comprising information of the modulation and coding scheme, the new data indicator (NDI) and the redundancy version. Hence, if only one codeword is used, only the first information field is used, and the second information field is unused and may thus, in accordance with a preferred embodiment of the invention, be used for transmitting interference layer information to the UE.

As can be seen from FIG. 4, left-hand column, the message contains information regarding antenna port(s), scrambling identity and number of layers. That is, the UE receives only data layer information. No more information is carried in the message.

As can be seen from FIG. 5, the UE may receive information about the data layer as well as an interference layer. According to a preferred embodiment of the present invention, a further column (referred to as "middle column" or "transmission layer information column") is introduced.

According to the embodiment of FIG. 5, the left-hand column indicates that no interference layer information is provided by "NDI=0" similarly as set out with respect to the first embodiment. However, for the case "NDI=1", the second embodiment provides more interference layer information to the UE than the mere information that interference is present as in the first embodiment. In particular, the interference layer information column indicates the specific antenna ports and corresponding reference signals of the interference layer(s).

In the third embodiment, the interference layer information column indicates not only the specific antenna ports and corresponding reference signals of the interference layer(s), but an indication is signalled to UE that the corresponding reference signals have some other distinguishing property, such as a different scrambling identity or modulation sequence corresponding to a different cell. An example of the third embodiment considering the scrambling identity, which is particularly preferred for MU-MIMO operation, is illustrated in FIG. 6.

In the fourth embodiment, a set of assumption(s) that the UE preferably makes about the interference may be configured by other signalling (e.g. by higher layers). The configured properties (referred to as "interference configuration" in FIG. 7) of the interfering reference signal(s) may include at least one of the following: number of antenna ports, scrambling identity, and cell ID. The fourth embodiment is particularly suitable for handling inter-cell interference.

For embodiments applied to the case of inter-cell interference, if an interfering cell, or potentially interfering cell is controlled by a different eNodeB, then information on the potentially interfering transmissions is preferably signalled in advance between the serving and the other eNodeBs. As mentioned above, this information preferably includes information on time and frequency domain resources to be used. This, together with other information, such as the UE location allows suitable interference information configurations to be determined and signalled. Each interference configuration may correspond to one of typical interference transmissions from the same cell or one or more neighbouring cells.

In the fifth embodiment, the interference layer information including the indicator for the presence of interference may also signal the use of transmission options not otherwise available, for example rank 1 transmission on port 9. The fifth embodiment may be particularly preferred for MU-MIMO operation.

Features of the above mentioned embodiments may be combined together and modified appropriately. Also, the embodiments may be modified by extending the transmission layer information with additional values (e.g. 0 to 15) to cover more possible configurations. Also, an additional signal bit (or more) in (or in addition to) a given DCI format or other control channel message format may be added.

FIG. 10 illustrates a preferred embodiment of a control unit 40 for carrying out one of the methods as described with the preferred embodiments. The control unit 40 controls the communication of a plurality of transmission layers from at least one cell 21, 22 which is under the control of at least one base station 10 to a user equipment 30. The plurality of transmission layers includes a data layer and an interference layer which are spatially multiplexed. The data layer comprises user data for the user equipment and the interference layer interferes with the data layer. The control unit 40 comprises: an interference layer information determining unit 41 for determining interference layer information relating to the interference layer, and a transmission control unit 42 for causing transmitting the data layer, the interference layer and a control channel message to the user equipment, wherein the control channel message comprises a first information field including data layer information relating to the data layer and a second information field including the interference layer information relating to the interference layer. The first information field comprises a first codeword field relating to a first codeword transmitted at least in part on the data layer, and the second information field comprises a second codeword field including the interference layer information in a first mode and relating to a second codeword transmitted at least in part on a further data layer of the plurality of transmission layers in a second mode.

The control unit 40 may be implemented in a base station as shown in FIG. 11. FIG. 11 a preferred embodiment of a base station 10 for carrying out one of the methods as described with the preferred embodiments. The base station 10 comprises the control unit 40 which causes the base station or at least one of the cells 21, 22 under the control of the base station to transmit the data layer, the interference layer and a control channel message to the user equipment. Also, the control unit 40 may cause another (preferably neighbouring) base station (not shown) to transmit the data layer, the interference layer and a control channel message to the user equipment by executing CoMP signalling. Also, the control unit may be implemented external to the base station, and may be comprised, for example, in a network control unit or a cell control unit.

FIG. 12 illustrates a preferred embodiment of a user equipment 30 for carrying out one of the methods as described with the preferred embodiments. The user equipment 30 communicates with the base station 10 and with the control unit 40 which may or may not be comprised in the base station 10. The user equipment 30 comprises a receiving unit 31 for receiving the data layer, the interference layer and a control channel message, wherein the control channel message comprises a first information field including data layer information relating to the data layer and a second information field including interference layer information relating to the interference layer, and a processing unit 32 for processing the data layer in accordance with the data layer information and for processing the interference layer in accordance with the interference layer information for obtaining the user data at the user equipment. The first information field comprises a first codeword field relating to a first codeword received on the data layer, and the second information field comprises a second codeword field including the interference layer information in a first mode and relating to a second codeword received on a further data layer of the plurality of transmission layers in a second mode.

FIG. 9, as already explained above, illustrates a preferred embodiment of a communication system 1 for communicating a plurality of transmission layers from at least one cell 21, 22 which is under the control of at least one base station 10 to a user equipment 30. The communication system comprises an interference layer information determining unit 41 for determining interference layer information relating to the interference layer, a transmission control unit 42 for causing transmitting the data layer, the interference layer and a control channel message to the user equipment, wherein the control channel message comprises a first information field including data layer information relating to the data layer and a second information field including the interference layer information relating to the interference layer, and a processing unit 32 for processing the data layer in accordance with the data layer information and for processing the interference layer in accordance with the interference layer information for obtaining the user data at the user equipment. The first information field comprises a first codeword field relating to a first codeword transmitted at least in part on the data layer, and the second information field comprises a second codeword field including the interference layer information in a first mode and relating to a second codeword transmitted at least in part on a further data layer of the plurality of transmission layers in a second mode.

What is claimed is:

1. A method of communicating a plurality of transmission layers from at least one cell which is under the control of at least one base station to a user equipment, wherein the plurality of transmission layers includes a data layer and an interference layer which are spatially multiplexed, wherein the data layer comprises user data for the user equipment and the interference layer interferes with the data layer, the method comprising:

determining, by the base station, data layer information relating to the data layer and interference layer information relating to the interference layer, transmitting, by the base station, the data layer, the interference layer and a control channel message to the user equipment, wherein the control channel message comprises a first information field including said data layer information relating to the data layer and a second information field including said interference layer information relating to the interference layer, and processing the data layer in accordance with said data layer information and processing the interference layer in accordance with the interference layer information for obtaining the user data at the user equipment, said processing further including determining a spatial covariance matrix of and interference source associated with the interference layer on the basis of the interference layer information, wherein the first information field of the control channel message comprises a first codeword field including said data layer information and transmitted at least in part on the data layer, and wherein the second information field of the control channel message comprises a second codeword field including the interference layer information and transmitted at least in part on a further data layer of the plurality of transmission layers.

2. The method of claim 1, wherein the second codeword field has the same number of bits in the first mode and the second mode.

3. The method of claim 1, wherein the second codeword field comprises a new data indicator field.

4. The method of claim 1, wherein the interference layer information indicates at least one of the following:
a spatial signature of the interference layer,
an antenna port of the interference layer,
the presence of the interference layer,
a presence of at least one further interference layer of the plurality of transmission layers,
a number of at least one further interference layer of the plurality of transmission layers,
a location of a reference signal relating to the interference layer,
locations of reference signals relating to at least one further interference layer of the plurality of transmission layers,
a modulation sequence of a reference signal relating to the interference layer, and
modulation sequences of reference signals relating to at least one further interference layer of the plurality of transmission layers.

5. The method of claim 1, wherein the method further comprises:
transmitting spatial covariance matrix information representing the spatial covariance matrix in the control channel message to the user equipment, and
wherein the step of processing the interference layer in accordance with the interference layer information at the user equipment includes:
processing the interference layer in accordance with the spatial covariance matrix information.

6. The method of claim 1, wherein the step of processing the interference layer in accordance with the interference layer information at the user equipment includes:
rejecting the interfering layer.

7. The method of claim 1, wherein the step of processing the data layer in accordance with the data layer information includes:
weighting the data layer with a first weighting factor in accordance with the data layer information, and
wherein the step of processing the interference layer in accordance with the interference layer information includes:
weighting the interference layer with a second weighting factor in accordance with the interference layer information, and
wherein the first weighting factor is higher than the second weighting factor.

8. The method of claim 1, wherein the method further comprises:
preparing feedback information indicating feedback based on the step of processing the interference layer, and
transmitting the feedback information from the user equipment to the at least one base station.

9. A non-transitory computer readable medium comprising a computer program code for, when executed, causing a computer to perform the method of claim 1.

10. A control circuitry for controlling a communication of a plurality of transmission layers from at least one cell which is under the control of at least one base station to a user equipment, wherein the plurality of transmission layers includes a data layer and an interference layer which are spatially multiplexed, wherein the data layer comprises user data for the user equipment and the interference layer interferes with the data layer, the control circuitry comprising:
an interference layer information determining circuitry for determining data layer information relating to the data layer and interference layer information relating to the interference layer,
a processing circuitry configured for determining a spatial covariance matrix of an interference source associated with the interference layer on the basis of the interference layer information, and
a transmission control circuitry for causing transmitting the data layer, the interference layer and a control channel message to the user equipment, wherein the control channel message comprises a first information field including said data layer information and a second information field including said interference layer information relating to the interference layer,
wherein the first information field of the control channel message comprises a first codeword field including said data layer information and transmitted at least in part on the data layer, and
wherein the second information field of the control channel message comprises a second codeword field including the interference layer information and transmitted at least in part on a further data layer of the plurality of transmission layers.

11. A base station for communicating a plurality of transmission layers from at least one cell which is under the control of the base station to a user equipment, wherein the plurality of transmission layers includes a data layer and an interference layer which are spatially multiplexed, wherein the data layer comprises user data for the user equipment and the interference layer interferes with the data layer, the base station comprising the control circuitry of claim 10.

12. A user equipment for receiving a plurality of transmission layers from at least one cell which is under the control of at least one base station, wherein the plurality of transmission layers includes a data layer and an interference layer which are spatially multiplexed, wherein the data layer comprises user data for the user equipment and the interference layer interferes with the data layer, the user equipment comprising:
- a receiving circuitry for receiving the data layer, the interference layer and a control channel message, wherein the control channel message comprises a first information field including data layer information relating to the data layer and a second information field including interference layer information relating to the interference layer, and
- a processing circuitry for processing the data layer in accordance with the data layer information and for processing the interference layer in accordance with the interference layer information for obtaining the user data at the user equipment, said processing circuitry further configured for determining a spatial covariance matrix of an interference source associated with the interference layer on the basis of the interference layer information,
- wherein the first information field of the control channel message comprises a first codeword field including at least a part of said data layer information and received on the data layer, and
- wherein the second information field of the control channel message comprises a second codeword field including at least a part of the interference layer information and received on a further data layer of the plurality of transmission layers.

13. A communication system for communicating a plurality of transmission layers from at least one cell which is under the control of at least one base station to a user equipment, wherein the plurality of transmission layers includes a data layer and an interference layer which are spatially multiplexed, wherein the data layer comprises user data for the user equipment and the interference layer interferes with the data layer, the communication system comprising:
- an interference layer information determining circuitry of the base station for determining data layer information relating to the data layer and interference layer information relating to the interference layer,
- a transmission control circuitry for causing transmitting by the base station of the data layer, the interference layer and a control channel message to the user equipment, wherein the control channel message comprises a first information field including said data layer information and a second information field including said interference layer information relating to the interference layer, and
- a processing circuitry for processing the data layer in accordance with said data layer information and for processing the interference layer in accordance with said interference layer information for obtaining the user data at the user equipment, said processing circuitry further configured for determining a spatial covariance matrix of an interference source associated with the interference layer on the basis of the interference layer information,
- wherein the first information field of the control channel message comprises a first codeword field including said data layer information and transmitted at least in part on the data layer, and
- wherein the second information field of the control channel message comprises a second codeword field including the interference layer information and transmitted at least in part on a further data layer of the plurality of transmission layers in a second mode.

* * * * *